United States Patent
Shah, Jr.

(10) Patent No.: US 9,459,519 B1
(45) Date of Patent: Oct. 4, 2016

(54) LARGE AREA ILLUMINATION AND PROJECTION APPARATUS

(71) Applicant: Vylite, LLC., Palo Alto, CA (US)

(72) Inventor: Binith Shah, Jr., Santa Monica, CA (US)

(73) Assignee: Vylite, LLC., Palo Alto, CA (US)

( * ) Notice: Subject to any disclaimer, the term of this patent is extended or adjusted under 35 U.S.C. 154(b) by 215 days.

(21) Appl. No.: 14/092,807

(22) Filed: Nov. 27, 2013

Related U.S. Application Data

(60) Provisional application No. 61/730,858, filed on Nov. 28, 2012.

(51) Int. Cl.
*G03B 21/20* (2006.01)
*H01J 65/04* (2006.01)
*F21S 8/08* (2006.01)
*F21V 23/02* (2006.01)

(52) U.S. Cl.
CPC ............... *G03B 21/20* (2013.01); *F21S 8/086* (2013.01); *F21V 23/023* (2013.01); *H01J 65/044* (2013.01)

(58) Field of Classification Search
CPC .............. G03B 21/20; G03B 21/2006; G03B 21/2026; H01J 65/044
USPC ..................... 353/85; 315/39, 39.51, 39.53
See application file for complete search history.

(56) References Cited

U.S. PATENT DOCUMENTS

| 2007/0103649 A1* | 5/2007 | Takada | H01J 65/044 353/85 |
| 2010/0165306 A1* | 7/2010 | McGettigan | G03B 21/2026 353/97 |

* cited by examiner

*Primary Examiner* — William C Dowling
*Assistant Examiner* — Ryan Howard
(74) *Attorney, Agent, or Firm* — Richard T. Ogawa; Ogawa P.C.

(57) ABSTRACT

The present invention is directed to lighting systems capable of projecting images. A lighting system with high-lumens, which can be at least 10,000 lumens, is configured to project images onto a large area. The lighting system uses plasma lamp as its light source. The small bulb of the plasma lamp enables projection of images over a large area. The lighting system includes a display module for generating images, which can be received over a communication interface or stored in a storage module. The lighting system may a part of roadway lamps, area lights, architectural lights, and other types of large area lighting.

20 Claims, 2 Drawing Sheets

LARGE AREA ILLUMINATION AND PROJECTION APPARATUS

CROSS-REFERENCES TO RELATED APPLICATIONS

This instant application claims priority to and is a non-provisional application of U.S. Application No. 61/730,858, filed on Nov. 28, 2012, which is incorporated by reference herein for all purposes.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to lighting systems capable of projecting images.

Over the past century, advertising, an industry that had been largely non-existent, has become an important part of everyday life. Companies, from big to small, invest a big portion of their hard-earned revenue back on advertising and marketing budget in order to attract customers. In addition to paying advertising agencies to produce advertisements and commercials in various forms and media, companies pay a lot of money to use advertising real estate. Newspapers, magazines, websites, television commercial breaks, bill boards, mobile applications, and other forms of media have all been used for advertising. With companies bidding for prominent advertising space, creating valuable advertising space becomes a lucrative proposition. For example, outdated telephone booths on busy streets are now valuable advertising space. In certain instances, people get creative. In many big Asian cities, taxicabs installed touch screen display systems that displays commercials to passengers. Yet with all these advertising options available, companies and advertising agencies are still looking for additional venues for advertisement.

Therefore, it is to be appreciated that new and improved techniques providing advertisement are desired.

BRIEF SUMMARY OF THE INVENTION

The present invention is directed to lighting systems capable of projecting images. More specifically, a lighting system with high-lumen, which can be at least 10,000 lumens, is configured to project images onto a large area. The lighting system uses plasma lamp as the light source. The small bulb of the plasma lamp enables projection of images over a large area. The lighting system includes a display module for generating images, which can be received over a communication interface or stored in a storage module. The lighting system may a part of roadway lamps, area lights, architectural lights, and other types of large area lighting applications.

According to an embodiment, the present invention provides a lighting apparatus that includes an enclosure having an aperture surface. The enclosure has an interface for attaching to a supporting structure. The apparatus also includes a bulb characterized by an internal volume of less than three cubic centimeters. The bulb is characterized by a maximum output level of at least 9000 lumens. The bulb is positioned inside the enclosure at a predetermined distance from the aperture surface. The apparatus includes a power module electrically coupled to the bulb. The power module is configured to supply power the bulb. The power module is configured to generate RF signals. The apparatus includes a communication interface for receiving images. The apparatus also includes a display module positioned within aperture surface. The display module is configured to generate the images received by the communication interface.

According to another embodiment, the present invention provides a street lamp apparatus that includes a supporting structure of at least three meters high. The apparatus also includes an enclosure attached to a top portion of the supporting structure. The enclosure has bottom surface. The bottom surface has an aperture region. The apparatus also includes a communication interface configured to receive data. The apparatus includes a display module positioned inside the enclosure and near the aperture region. The display module is configured to display images based on the received data. The apparatus further includes an RF source positioned within the enclosure, the RF source being configured to generate RF signals of at least 300 MHz. The apparatus includes a resonator structure electrically coupled to the RF source. The apparatus also includes an electrodeless bulb characterized by an internal volume of less than three cubic centimeters. The elecrodeless bulb is characterized by a maximum output level of at least 9000 lumens and positioned inside the enclosure at a predetermined distance from the display module, the electrodeless bulb being adapted to emit different light colors based on power levels of the RF signals.

It is to be appreciated that embodiments of the present invention provide numerous advantages over conventional systems.

DETAILED DESCRIPTION OF THE INVENTION

Figure 1:
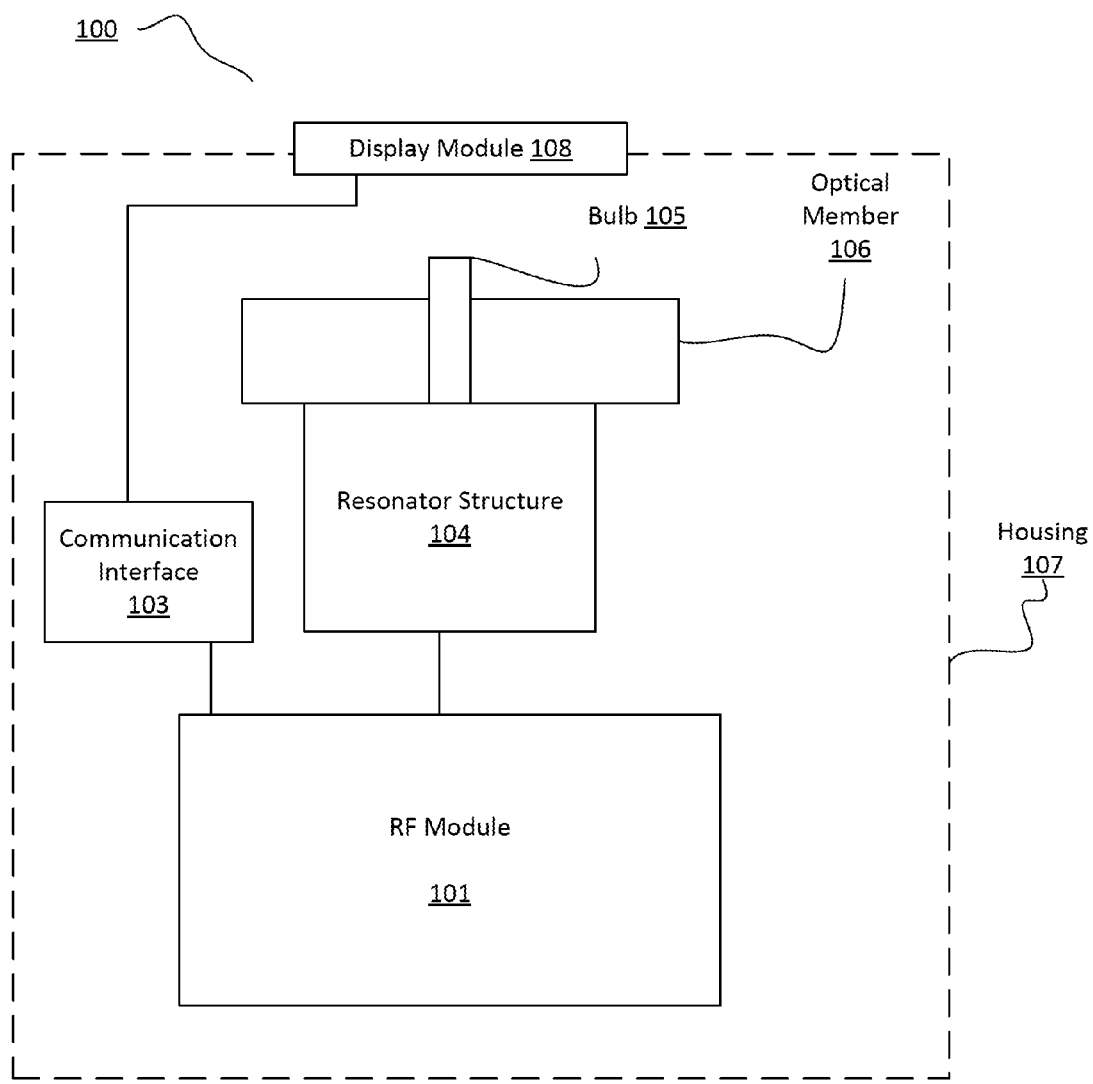
FIG. 1 is a simplified block diagram illustrating lighting system 100.

The present invention is directed to lighting systems capable of projecting images. More specifically, a lighting system with high-lumen, which can be at least 10,000 lumens, is configured to project images onto a large area. The lighting system uses plasma lamp as the light source. The small bulb of the plasma lamp enables projection of images over a large area. The lighting system includes a display module for generating images, which can be received over a communication interface or stored in a storage module. The lighting system may a part of roadway lamps, area lights, architectural lights, and other types of large area lighting applications.

As explained above, advertising spaces have become value commercial real estates. Millions, if not billions, of dollars are spent each year to purchase advertising spaces in crowded areas, and putting expensive advertising prints on billboards, walls, sides of telephone booths, etc. Due to various limitations, floor of streets, parking lots, and other public areas has not been used for advertising space. One difficulty is painting images on the floor is often expensive, and once painted on the floor, the images wear of quickly, but not completely (thereby adding removal cost later). It is thus to be appreciated that embodiments of the present invention provide an inexpensive way to project images and/or video onto and illuminate a relatively large area. For example, a lighting system according is used both for projection and illumination. The lighting system is capable of illuminating an area of at least 25 square meters and projecting images at the illuminated area. The lighting system uses plasma lamp as light source. For example, the plasma lamp light source utilizes electrodeless bulbs that are small in size, typically having smaller than 3 cubic centimeters of internal volume. The bulb can have a maximum output level of at least 10,000 lumens. The combination of small bulb size and high lumen output enable the lighting system to project images and/or video over a large area and also be used as area lamp. In comparison, conventional street lamps uses large bulb (e.g., high pressure sodium lamp, HID, etc.) as light source, and due the size of large blub, they cannot be used to project images.

In addition to the ability to high brightness and large area projection, the lighting systems according to the embodiments of the present invention are network capable, thereby allowing them to receive control signals and images over the network. In a certain embodiments, the lighting systems are connected to sensors or have integrated sensors. For example, once a sensor detects identification information associated with a pedestrian walking toward a lighting system, the sensor sends identification information to the lighting system, and the lighting system projects an image that contains advertisement relevant to that pedestrian. For example, the identification information indicates that the pedestrian prefers Italian food, and the lighting system determines since it is dinner time this pedestrian might be looking for a restaurant, the lighting system project the logo of a nearby Italian restaurant.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified block diagram illustrating lighting system 100. This diagram is merely an example, which should not unduly limit the scope of the claims herein. One of ordinary skill in the art would recognize other variations, modifications, and alternatives. For example, the lighting system 100 can be implemented as street lamp, area lamp, high bay lamp, and/or other types of lighting fixtures.

The lighting system 100 includes a plasma light source that includes bulb 105, resonator structure 104, and an RF module 101. The resonator structure 104 and the RF module 101 are electrically coupled. For example, the resonator structure 104 and RF module 101 are connected to each via a coaxial cable. The RF module 101 converts electrical energy into RF energy. The RF energy is delivered to the bulb 105 via the resonator structure 104. Depending on the application, the resonator structure 104 can be a cylindrical structure that is hollow inside or a block of material filled with dielectric material (e.g., ceramic). For example, one type of plasma light source is described in U.S. Pat. No. 7,830,092, titled "Electrodeless lamps with externally-grounded probes and improved bulb assemblies", which is incorporated by reference here in for all purposes. Another type of plasma light source is described in U.S. Pat. No. 8,188,662, titled "PLASMA LAMP HAVING TUNABLE FREQUENCY DIELECTRIC WAVEGUIDE WITH STABILIZED PERMITTIVITY", which is incorporated by reference here in for all purposes.

The RF module 101 is electrically coupled to the communication interface 103 and receives control signals from the communication interface 103. In an embodiment, communication interface 103 may include a wireless communication interface for receiving and/or sending signals associated with the control of the RF module 101. The RF module 101 is adapted to generate RF energy at strength of about 20% to 100% of maximum power. For example, the communication interface 103 may receive control signals to cause the RF module 101 to operate at a reduced power level (e.g., 20%) without being turn off in order to conserve energy. In addition, the RF module 101 may change power level for the purpose of changing color of light emitted by the bulb 105. Depending on the chemical composition of material inside the bulb 105, the bulb 105 emits different colors respectively at 20% and 100% power level, and other colors are possible as well. The bulb 105 is characterized by a relatively small size. For example, the internal volume of the bulb is less than 3 cubic centimeters, and the exterior volume of the bulb is less than 5 cubic centimeters. The bulb 105 can be substantially oval-shaped, which provide relatively uniform light output. It is to be appreciated that the relative small size and good uniformity of the bulb 105 make it suitable and even ideal for projection use.

In addition to control signals, the communication interface 103 is configured to receive and/or process various types of data over the network. For example, the communication interface 103 receives advertising images and/or video from a remote network. The advertising images and/or video can be updated periodically, or update dynamically. For example, the communication interface 103 receives hourly image updates from a remote server over the network, and the hourly image updates may come with control signals (to indicate the color of light to be used to project the image). The communication interface 103 may additionally receive identification information from one or more sensors, which can be a part of the lighting system 100 or external sensors that are capable of sending identification information to the communication interface 103. In the example above, the identification information indicates that the pedestrian prefers Italian food, and the lighting system 100 determines since it is dinner time this pedestrian might be looking for a restaurant, the lighting system project the logo of a nearby Italian restaurant. The logo can be an image stored a storage module of the lighting system 100 or retrieved by the communication interface 103 in response to the identification information received. It is to be appreciated that the communication interface 103 may be compatible with one or more type of technologies, such as cellular technology, WIFI, power line communication, and/or others.

As shown in FIG. 1, the communication interface 103 is also connected to the display module 108. The display module 108 is positioned at an aperture region of the housing 107. As shown, the display module 108 is connected to the communication interface 103, from which it receives images and/or video data. The display module 108 processes the data received from the communication interface 103 and generates the images and/or video to be displayed. Depending on the application, technologies such as LCD, DLP, LCoS, and/or others can be used to implement the display module 108. The bulb 105 is positioned at a predetermined distance from the display module 108, and the bulb 105 illuminates the images and/or video provided by the display module 108. As described above, the bulb 105, with is high lumen output, relative uniform light output, and small bulb size, is ideal for illuminating the images and/or video generated by the display module 108.

The optical member 106 directs light generated by the bulb 105 to the display module 108. For example, the optical member 106 comprises a reflector in a concave shape. The reflector can be highly reflective (e.g., 95% or greater reflectivity). In certain embodiments, the optical member 106 can be moved closer to or further from the display module and the bulb 105 to change the light pattern. In a specific embodiment, the optical member 106 is coupled to a focusing mechanism, which allows the images on the display module to be clearly projected to an area.

Various components of the lighting system are positioned and secured within a housing 107. The housing 107, among other things, provides environmental protection for various electrical components, such as the RF module 101, the control module 103, and the communication interface. For example, the housing 107 is rugged in construction to allow deployment in rough environment and/or use conditions (e.g., emergency rescue situations, military uses, etc.). The housing 107 can be thermally coupled to the RF module 101 and/or the resonator structure. For example, the housing 107 comprises metal (e.g., aluminum, stainless steel, magnesium alloy, etc.) or other type of material. In addition to provide environmental protections to RF module 101 and/or other components, the housing 107 may also provide means of heat dissipation. For example, the housing 107 comprises material with high thermal conductivity (such as aluminum) and large heat-dissipating surfaces. Depending on the application, the housing 107 may comprise or attach to one or more heat sink modules. For example, one or more heat sinking modules are thermally coupled to the housing and comprises large heat dissipating surfaces (e.g., fins). The housing 107 is adapted to be removable, thereby allowing adjustment to be performed on the RF module and/or other components inside the housing 107.

Figure 2:
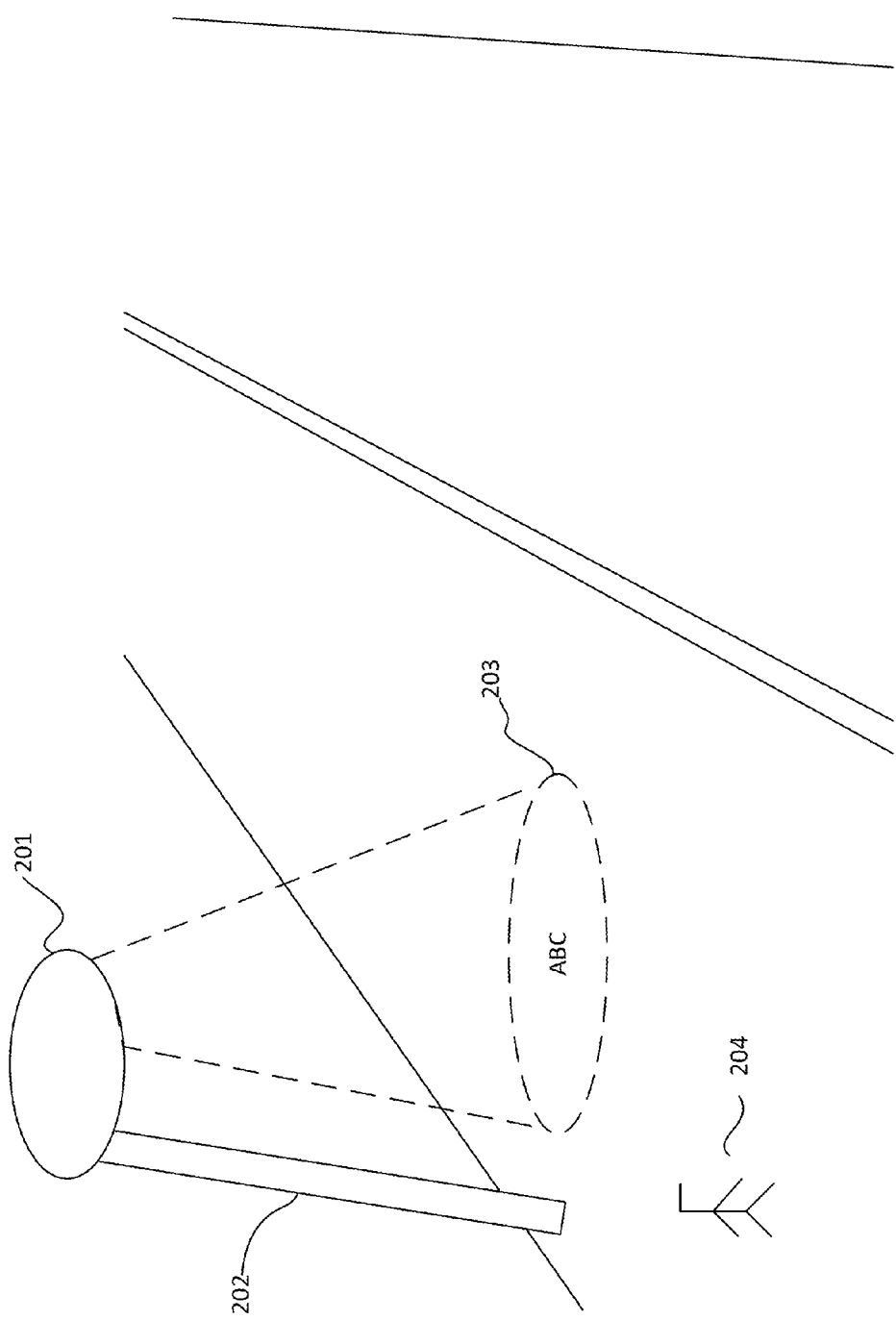
FIG. 2 is a simplified diagram illustrating a lighting system 201 in operation according to embodiments of the present invention.

FIG. 2 is a simplified diagram illustrating a lighting system 201 in operation according to embodiments of the present invention. This diagram is merely an example, which should not unduly limit the scope of the claims herein. One of ordinary skill in the art would recognize other variations, modifications, and alternatives. As shown in FIG. 2, the lighting system 201 is supposed by a pole 202. For example, the lighting system 201 can be implemented using the lighting system 100 illustrated in FIG. 1. The lighting system 201 is positioned at a predetermined height and projects images and/or video to a region 203 on the ground. For example, the region 203 is on a sidewalk. A pedestrian 204 near the region 203 is able to view the images and/or video projected by the lighting system 202. As explained above, the images and/or video may contain advertising material that is relevant and/or usable to the pedestrian 204.

It is to be appreciated that the lighting system 100 described above can be used in a wide variety of applications. In addition to street lighting applications, the lighting system 100 can also be used for indoor arenas. In a specific embodiment, the lighting system 100 is configured to project images scores and advertising graphics onto the floor of basket ball court, hockey fields, and others. The lighting system 100 can also be used to light up large sized billboards. For example, the lighting system 100 projects images and/or color onto a billboard that already has graphic to enhance the billboard. The lighting system 100 can also be used in entertainment related applications, such as bars, restaurants, concerts, etc.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A lighting apparatus comprising:
an enclosure having an aperture surface, the enclosure having an interface for attaching to a supporting structure;
a bulb characterized by an internal volume of less than three cubic centimeters, the bulb being characterized by a maximum output level of at least 9000 lumens, the bulb being positioned inside the enclosure at a predetermined distance from the aperture surface;
a power module electrically coupled to the bulb, the power module being configured to supply power to the bulb, the power module being configured to generate RF signals;
a communication interface for receiving images; and
a display module positioned within the aperture surface, the display module being configured to generate the images received by the communication interface; wherein the images are illuminated by the bulb and projected on a region of the ground.

2. A lighting apparatus comprising:
an enclosure having an aperture surface, the enclosure having an interface for attaching to a supporting structure;
a bulb characterized by an internal volume of less than three cubic centimeters, the bulb being characterized by a maximum output level of at least 9000 lumens, the bulb being positioned inside the enclosure at a predetermined distance from the aperture surface;
a power module electrically coupled to the bulb, the power module being configured to supply power to the bulb, the power module being configured to generate RF signals;
a communication interface for receiving images; and
a display module positioned within the aperture surface, the display module being configured to generate the images received by the communication interface; the supporting structure having a height of at least three meters disengagebly coupled to the enclosure.

3. A lighting apparatus comprising:
an enclosure having an aperture surface, the enclosure having an interface for attaching to a supporting structure;
a bulb characterized by an internal volume of less than three cubic centimeters, the bulb being characterized by a maximum output level of at least 9000 lumens, the bulb being positioned inside the enclosure at a predetermined distance from the aperture surface;
a power module electrically coupled to the bulb, the power module being configured to supply power to the bulb, the power module being configured to generate RF signals;
a communication interface for receiving images; and
a display module positioned within the aperture surface, the display module being configured to generate the images received by the communication interface;
an optical member for projecting the images generated by the display module at a distance of at least three meters.

4. The apparatus of claim 1 wherein the bulb is adapted to change color at different power levels.

5. The apparatus of claim 1 wherein the power module is conceived to receive control signals from the communication interface for changing the power supplied to the bulb to cause the bulb to change color of light emitted.

6. The apparatus of claim 1 wherein the aperture surface is positioned at the bottom surface of the enclosure.

7. The apparatus of claim 1 further comprising a thermal management module.

8. The apparatus of claim 1 wherein the bulb is electrodeless.

9. A lighting apparatus comprising:
an enclosure having an aperture surface, the enclosure having an interface for attaching to a supporting structure;
a bulb characterized by an internal volume of less than three cubic centimeters, the bulb being characterized by a maximum output level of at least 9000 lumens, the bulb being positioned inside the enclosure at a predetermined distance from the aperture surface;
a power module electrically coupled to the bulb, the power module being configured to supply power to the bulb, the power module being configured to generate RF signals;
a communication interface for receiving images; and
a display module positioned within the aperture surface, the display module being configured to generate the images received by the communication interface; wherein the enclosure is environmentally sealed.

10. The apparatus of claim 9 further comprising a resonator structure electrically coupled to the power module.

11. The apparatus of claim 9 wherein the power module comprises an RF source associated with a frequency of at least 300 MHz.

12. The apparatus of claim 9 further comprising a power supply.

13. The apparatus of claim 9 wherein the communication interface comprises a wireless communication module.

14. A street lamp apparatus comprising:
a supporting structure of at least three meters high;
an enclosure attached to a top portion of the supporting structure, the enclosure having bottom surface, the bottom surface having an aperture region;
a communication interface configured to receive data;
a display module positioned inside the enclosure and near the aperture region, the display module being configured to display images based on the received data;
an RF source positioned within the enclosure, the RF source being configured to generate RF signals of at least 300 MHz;
a resonator structure electrically coupled to the RF source; and
an electrodeless bulb characterized by an internal volume of less than three cubic centimeters, the elecrodeless bulb being characterized by a maximum output level of at least 9000 lumens, the elecrodeless bulb being positioned inside the enclosure at a predetermined distance from the display module, the electrodeless bulb being adapted to emit different light colors based on power levels of the RF signals.

15. The apparatus of claim 14 wherein:
the enclosure is positioned at a height of at least 2.5 meters;
the electrodeless bulb is configured to project images of the display module at an area about 2.5 meters below the enclosure.

16. The apparatus of claim 14 further wherein the enclosure comprises a heat sink module.

17. The apparatus of claim 14 wherein the RF source is adapted to adjust power level from 20% to 100%.

18. The apparatus of claim 14 further comprising a storage module for storing data received by the communication interface.

19. The apparatus of claim 14 wherein the data is related to a pedestrian within 50 meters from the apparatus.

20. The apparatus of claim 14 further a sound module configured to playback sound based on the data.

* * * * *